United States Patent
Williams

(10) Patent No.: US 6,220,199 B1
(45) Date of Patent: Apr. 24, 2001

(54) TIRE WITH WORN TREAD INDICATOR

(76) Inventor: Wildon Williams, 622 North 5th St., La Porte, TX (US) 77571

( * ) Notice: Subject to any disclaimer, the term of this patent is extended or adjusted under 35 U.S.C. 154(b) by 0 days.

(21) Appl. No.: 09/234,870

(22) Filed: Jan. 21, 1999

(51) Int. Cl.[7] .................................................. B60C 11/24
(52) U.S. Cl. .................... 116/208; 152/154.2; 116/206
(58) Field of Search ............................ 116/208, 206, 116/200, 201, 28 R, DIG. 1; 152/154.2, 209.5

(56) References Cited

U.S. PATENT DOCUMENTS

| | | | |
|---|---|---|---|
| 647,987 | * | 4/1900 | Roney ................................ 152/154.2 |
| 3,362,376 | * | 1/1968 | Norton ................................. 116/208 |
| 3,814,160 | * | 6/1974 | Creasey .............................. 152/154.2 |
| 3,929,179 | * | 12/1975 | Hines .................................. 152/154.2 |
| 4,074,742 | * | 2/1978 | Chamblin ........................... 152/154.2 |
| 4,226,274 | * | 10/1980 | Awaya et al. ....................... 152/154.2 |
| 5,451,110 | * | 9/1995 | Gams, Jr. et al. .................... 384/624 |

* cited by examiner

*Primary Examiner*—Andrew H. Hirshfeld
*Assistant Examiner*—R. Alexander Smith

(57) ABSTRACT

A tire with worn tread indicator for providing a visual indication that a tire's tread is worn below a predetermined level. The tire with worn tread indicator includes a tire with a treaded outer surface having a plurality of alternating tread channels and tread ridges. A plurality of spaced apart elongate gel tubes are embedded in the tire and positioned adjacent the treaded outer surface. In the lumen of each gel tube is a visibly detectable colored liquid therein.

11 Claims, 2 Drawing Sheets

TIRE WITH WORN TREAD INDICATOR

BACKGROUND OF THE INVENTION

1. Field of the Invention

The present invention relates to tire with worn tread indicators and more particularly pertains to a new tire with worn tread indicator for providing a visual indication that a tire's tread is worn below a predetermined level.

2. Description of the Prior Art

The use of tire with worn tread indicators is known in the prior art. More specifically, tire with worn tread indicators heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 3,814,160 by Creasey; U.S. Pat. No. 4,226,274 by Awaya et al.; U.S. Pat. No. 3,362,376 by Norton; U.S. Pat. No. 4,074,742 by Chamblin; U.S. Pat. No. 3,929,179 by Hines; and U.S. Pat. No. 647,987 by Roney.

While these devices fulfill their respective, particular objectives and requirements, the aforementioned patents do not disclose a new tire with worn tread indicator. The inventive device includes a tire with a treaded outer surface having a plurality of alternating tread channels and tread ridges. A plurality of spaced apart elongate gel tubes are embedded in the tire and positioned adjacent the treaded outer surface. In the lumen of each gel tube is a visibly detectable colored liquid therein.

In these respects, the tire with worn tread indicator according to the present invention substantially departs from the conventional concepts and designs of the prior art, and in so doing provides an apparatus primarily developed for the purpose of providing a visual indication that a tire's tread is worn below a predetermined level.

SUMMARY OF THE INVENTION

In view of the foregoing disadvantages inherent in the known types of tire with worn tread indicators now present in the prior art, the present invention provides a new tire with worn tread indicator construction wherein the same can be utilized for providing a visual indication that a tire's tread is worn below a predetermined level.

The general purpose of the present invention, which will be described subsequently in greater detail, is to provide a new tire with worn tread indicator apparatus and method which has many of the advantages of the tire with worn tread indicators mentioned heretofore and many novel features that result in a new tire with worn tread indicator which is not anticipated, rendered obvious, suggested, or even implied by any of the prior art tire with worn tread indicators, either alone or in any combination thereof.

To attain this, the present invention generally comprises a tire with a treaded outer surface having a plurality of alternating tread channels and tread ridges. A plurality of spaced apart elongate gel tubes are embedded in the tire and positioned adjacent the treaded outer surface. In the lumen of each gel tube is a visibly detectable colored liquid therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tire with worn tread indicator apparatus and method which has many of the advantages of the tire with worn tread indicators mentioned heretofore and many novel features that result in a new tire with worn tread indicator which is not anticipated, rendered obvious, suggested, or even implied by any of the prior art tire with worn tread indicators, either alone or in any combination thereof.

It is another object of the present invention to provide a new tire with worn tread indicator which may be easily and efficiently manufactured and marketed.

It is a further object of the present invention to provide a new tire with worn tread indicator which is of a durable and reliable construction.

An even further object of the present invention is to provide a new tire with worn tread indicator which is susceptible of a low cost of manufacture with regard to both materials and labor, and which accordingly is then susceptible of low prices of sale to the consuming public, thereby making such tire with worn tread indicator economically available to the buying public.

Still yet another object of the present invention is to provide a new tire with worn tread indicator which provides in the apparatuses and methods of the prior art some of the advantages thereof, while simultaneously overcoming some of the disadvantages normally associated therewith.

Still another object of the present invention is to provide a new tire with worn tread indicator for providing a visual indication that a tire's tread is worn below a predetermined level.

Yet another object of the present invention is to provide a new tire with worn tread indicator which includes a tire with a treaded outer surface having a plurality of alternating tread channels and tread ridges. A plurality of spaced apart elongate gel tubes are embedded in the tire and positioned adjacent the treaded outer surface. In the lumen of each gel tube is a visibly detectable colored liquid therein.

Still yet another object of the present invention is to provide a new tire with worn tread indicator that provides a visual indicator to warn a user when to replace worn tires in order to help reduce the risk of a blow-out from a worn tire.

Even still another object of the present invention is to provide a new tire with worn tread indicator that may be used in ties with any type of tread arrangement.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
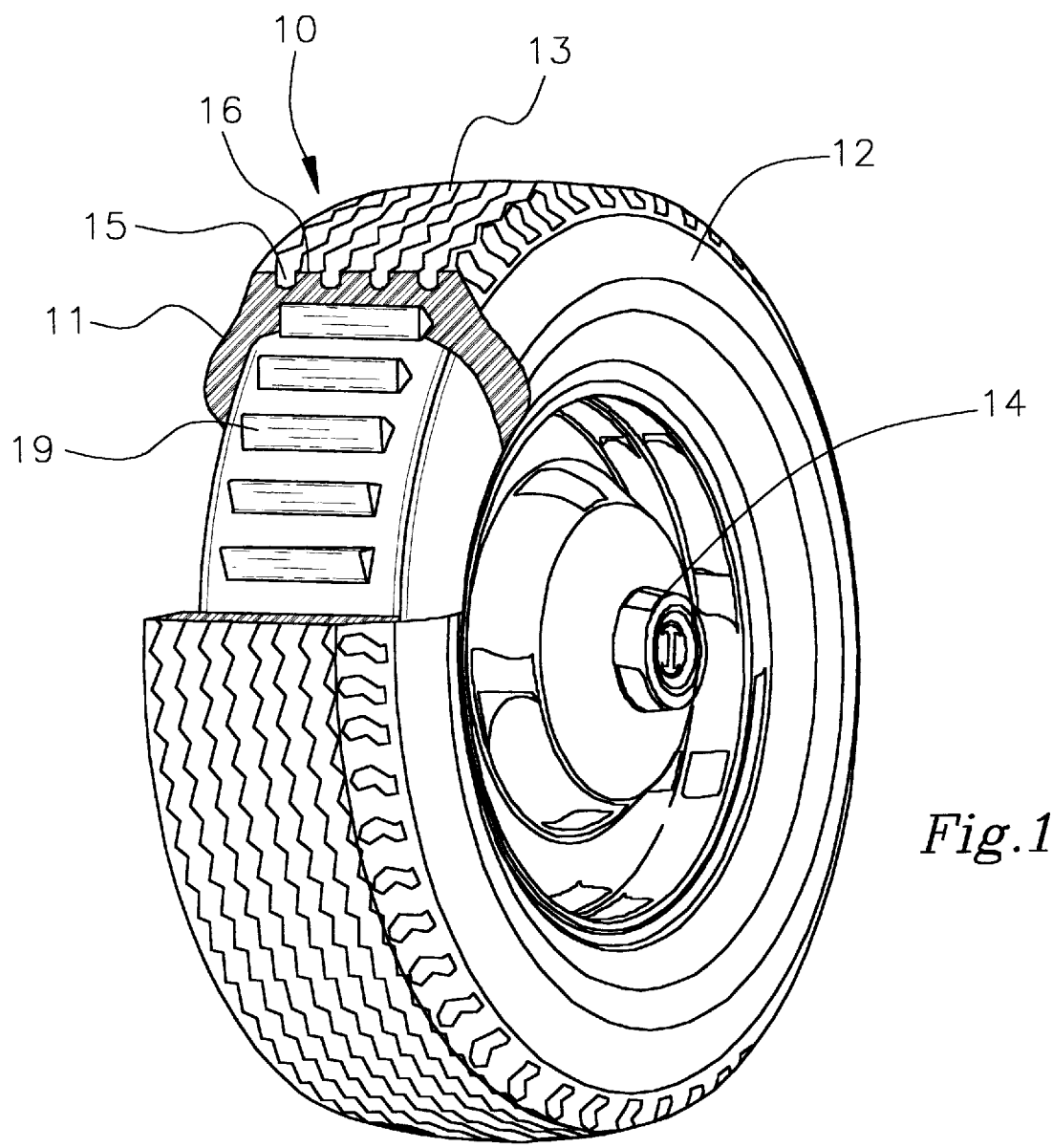
FIG. 1 is a schematic breakaway perspective view of an embodiment of the present invention.

With reference now to the drawings, and in particular to FIGS. 1 through 7 thereof, a new tire with worn tread indicator embodying the principles and concepts of the present invention will be described.

As best illustrated in FIGS. 1 through 7, the tire with worn tread indicator generally comprises a tire with a treaded outer surface having a plurality of alternating tread channels and tread ridges. A plurality of spaced apart elongate gel tubes are embedded in the tire and positioned adjacent the treaded outer surface. In the lumen of each gel tube is a visibly detectable colored liquid therein.

In closer detail, a rubber pneumatic tire 10 has a spaced apart pair of annular side walls 11,12 and an annular treaded outer surface 13 interposed between the side walls of the tire and an inner surface the faces the wheel 14 to which the tire is mounted. The treaded outer surface of the tire has a plurality of alternating tread channels 15 and tread ridges 16 therearound that may be of any tread shape and configuration. The tread ridges define an upper surface 17 of the treaded outer surface while the tread channels of the treaded outer surface define a lower surface 18 of the treaded outer surface. The upper and lower surfaces define a tread depth of the treaded outer surface therebetween.

Figure 2:
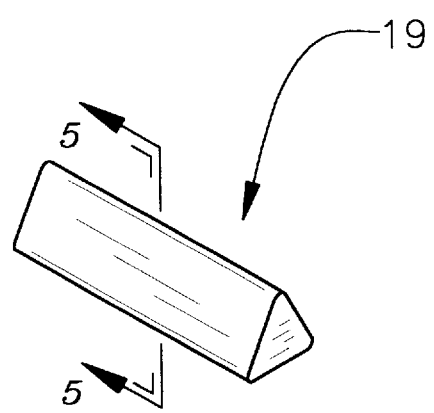
FIG. 2 is a schematic perspective view of an embodiment of a gel tube.
Figure 3:
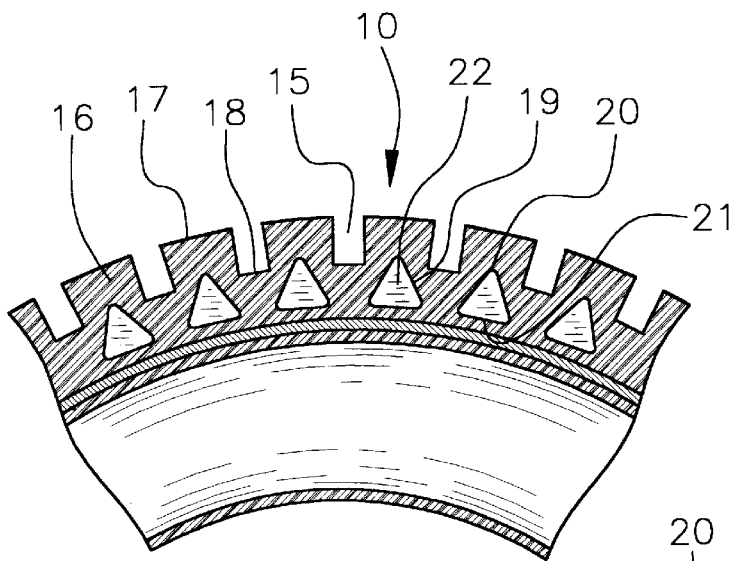
FIG. 3 is a schematic cross sectional view of an embodiment of the present invention.

A plurality of spaced apart elongate gel tubes 19 are embedded in the tire. Preferably, as illustrated in FIG. 2, each of the gel tubes is a generally triangular prism shape such that each gel tube has a generally triangular transverse cross section substantially perpendicular to a longitudinal axis of the respective gel tube. Each of the gel tubes has at least one vertex 20 and a side 21 opposite this one vertex. The gel tubes are positioned adjacent the treaded outer surface. The one vertex of each gel tubes is preferably positioned in the tire between the upper and lower surfaces of the treaded outer surface and spaced apart a predetermined distance from the upper surface of the treaded outer surface. The side opposite the one vertex of each gel tube preferably faces towards the inner surface of the tire.

Figure 7:
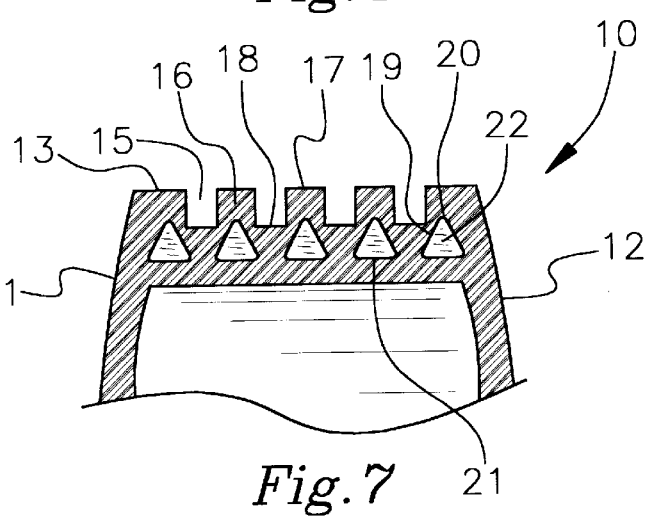
FIG. 7 is a schematic cross sectional view of another embodiment of the present invention with the gel tubes each being extended around the tire.

The longitudinal axes of the gel tubes are preferably extended substantially parallel to one another. In one preferred embodiment, the longitudinal axes of the gel tubes are extended between the side walls of the tire and generally parallel with the axis of rotation of the wheel. With reference to FIG. 7, in another preferred embodiment, the gel tubes are annular in shape and are extended around the tire generally parallel to the tread channels and ridges.

Figure 6:
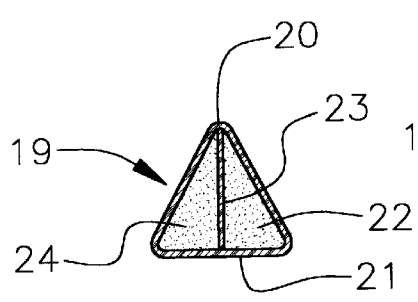
FIG. 6 is a schematic transverse cross section view of an embodiment of the gel tube with a partition dividing the lumen into two separate chambers.

Each of the gel tubes has a lumen with a visibly detectable colored liquid therein 22. In one preferred embodiment, the colored liquid comprises a visibly detectable colored viscous gel. In another preferred embodiment, as shown in FIG. 6, each of the gel tubes has a partition 23 dividing the lumen of the respective gel tube into a pair of separate chambers. The partition of each gel tube is preferably extended from the one vertex of the respective gel tube to an opposite side of the respective gel tube. The colored liquid is provided in one of the chambers of the lumen. In this preferred embodiment, the colored liquid preferably comprises a colored liquid resin. Provided in the other chamber of each gel tube of this preferred embodiment is a liquid hardening agent 24. When mixed together, the liquid resin and the liquid hardening agent react to form a visibly detectable colored solid.

Figure 4:
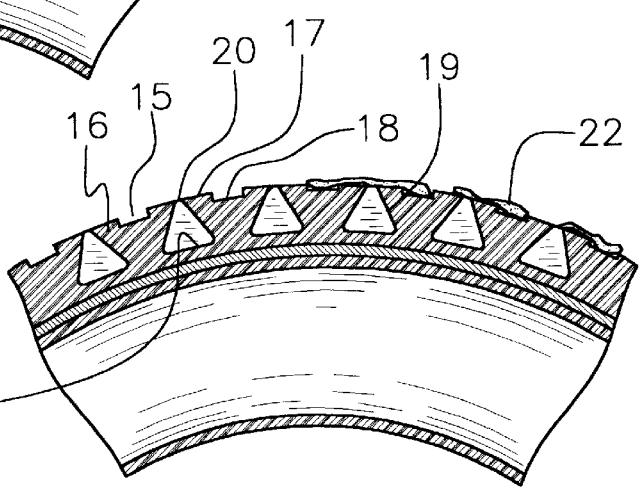
FIG. 4 is a schematic cross sectional view of the embodiment of the present invention in FIG. 3, with the upper surface worn down to break open some of the gel tubes to release the colored liquid to visibly indicate the location of a worn spot on the treaded outer surface of the tire.
Figure 5:
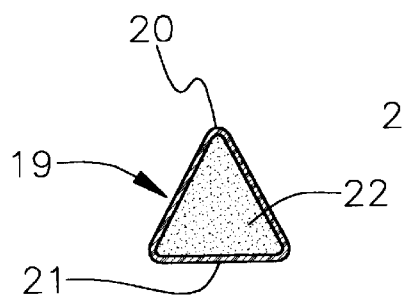
FIG. 5 is a schematic transverse cross section view of an embodiment of the gel tube.

With particular reference to FIG. 4, in use, reducing by wear of the tread depth of the treaded outer surface to a predetermined depth breaks open by wear at least of gel tubes to release the colored liquid therein so that the colored flows on to the threaded outer surface of the tire to provide a visual indicator to a user that the tread depth of the treaded outer surface is less than the predetermined depth. Ideally, the one vertex and the lower surface of the treaded outer surface define the predetermined depth therebetween. In the resin/hardening embodiment, when the gel tube is broken open, the solid formed by the resin and the hardening agent hardens on the treaded outer surface around the worn region to indicate to a user the location of the worn region.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tire tread wear indicating system, comprising:
   a tire having a spaced apart pair of side walls and a treaded outer surface interposed between said side walls of said tire;
   said treaded outer surface of said tire having a plurality of alternating tread channels and tread ridges;
   said tread ridges defining an upper surface of said treaded outer surface, said tread channels of said treaded outer surface defining a lower surface of said treaded outer surface;
   a plurality of spaced apart elongate gel tubes being embedded in said tire;
   said gel tubes being positioned adjacent said treaded outer surface; and
   each of said gel tubes having a lumen, each of said lumens having a visibly detectable colored liquid therein.

2. The tire tread wear indicating system of claim 1, wherein each of said gel tubes has a generally triangular prism shape such that each gel tube has a generally triangular transverse cross section.

3. The tire tread wear indicating system of claim 2, wherein each of said gel tubes has at least one vertex, said at least one vertex of each of said gel tubes being embedded in said tire below said upper surface at a first depth below said upper surface, said first depth being less than a tread depth defined by said upper and lower surfaces.

4. The tire tread wear indicating system of claim 1, wherein each of said gel tubes has a longitudinal axis, said longitudinal axes of said gel tubes being extended substantially parallel to one another, said longitudinal axis of said gel tubes being extended between said side walls of said tire.

5. The tire tread wear indicating system of claim 1, wherein said colored liquid comprises a visibly detectable colored gel.

6. The tire tread wear indicating system of claim 1, wherein each of said gel tubes has a partition dividing said lumen of the respective gel tube into a pair of separate chambers, said colored liquid being provided in one of said chambers of said lumen.

7. The tire tread wear indicating system of claim 6, wherein said colored liquid comprises a colored liquid resin, each of said gel tubes having a liquid hardening agent in the other of said chambers, wherein said liquid resin and said liquid hardening agent forming a visibly detectable colored solid when mixed together.

8. The tire tread wear indicating system of claim 1, wherein said treaded outer surface of said tire comprises a circumferential pattern such that said tread ridges extend along a circumference of said tire, a longitudinal axis of each of said gel tubes being oriented substantially parallel to said tread ridges.

9. The tire tread wear indicating system of claim 1, wherein said treaded outer surface of said tire comprises a circumferential pattern such that said tread ridges extend along a circumference of said tire, a longitudinal axis of each of said gel tubes being oriented substantially perpendicular to said tread ridges.

10. The tire tread wear indicating system of claim 1, wherein each of the tread ridges and tread channels of said treaded outer surface of said tire extends substantially from a first one of said side walls to a second one of said side walls, a longitudinal axis of each of said gel tubes being oriented substantially parallel to said tread ridges and said tread channels.

11. A tire tread wear indicating system, comprising:
    a tire having a spaced apart pair of annular side walls and an annular treaded outer surface interposed between said side walls of said tire;
    said treaded outer surface of said tire having a plurality of alternating tread channels and tread ridges therearound;
    said tread ridges defining an upper surface of said treaded outer surface, said tread channels of said treaded outer surface defining a lower surface of said treaded outer surface;
    said upper and lower surfaces defining a tread depth of said treaded outer surface therebetween;
    a plurality of spaced apart elongate gel tubes being embedded in said tire, each of said gel tubes having a longitudinal axis;
    each of said gel tubes having a generally triangular prism shape such that each gel tube has a generally triangular transverse cross section substantially perpendicular to said longitudinal axis of the respective gel tube;
    wherein each of said gel tubes has three vertices and three sides;
    said gel tubes being positioned adjacent said treaded outer surface;
    one of said vertices of each of said gel tubes being embedded in said tire below said upper surface at a first depth below said upper surface, said first depth being less than a tread depth defined by said upper and lower surfaces;
    said longitudinal axis of each of said gel tubes being extended substantially parallel to one another, said longitudinal axis of said gel tubes being extended between said side walls of said tire;
    each of said gel tubes having a lumen, each of said lumens having a visibly detectable colored liquid therein;
    each of said gel tubes having a partition dividing said lumen of the respective gel tube into a pair of separate chambers;
    each said partition extending from said one of said vertices of the respective gel tube to an opposite side of the respective gel tube;
    said colored liquid being provided in one of said separate chambers of said lumen; and
    each of said gel tubes having a liquid hardening agent in the other of said chambers.

* * * * *